United States Patent [19]

Hofer et al.

[11] Patent Number: 4,662,336

[45] Date of Patent: May 5, 1987

[54] FUEL INJECTION PUMP FOR SELF-IGNITING INTERNAL COMBUSTION ENGINES

[75] Inventors: Gerald Hofer, Weissach-Flacht; Heinz Nothdurft, Stuttgart, both of Fed. Rep. of Germany

[73] Assignee: Robert Bosch GmbH, Stuttgart, Fed. Rep. of Germany

[21] Appl. No.: 771,857

[22] Filed: Sep. 3, 1985

[30] Foreign Application Priority Data

Oct. 2, 1984 [DE] Fed. Rep. of Germany ....... 3436042

[51] Int. Cl.⁴ .............................................. F02M 59/24
[52] U.S. Cl. .................................... 123/449; 123/503; 417/268
[58] Field of Search .............. 123/449, 496, 503, 299, 123/300; 417/254, 268

[56] References Cited

U.S. PATENT DOCUMENTS 2,958,289  11/1960  Hafele ................................. 417/268

FOREIGN PATENT DOCUMENTS

| 3117220 | 1/1982 | Fed. Rep. of Germany | 123/449 |
| 132022 | 10/1979 | Japan | 123/449 |
| 82572 | 5/1984 | Japan | 123/449 |
| 155569 | 9/1984 | Japan | 123/449 |

Primary Examiner—Tony M. Argenbright
Attorney, Agent, or Firm—Edwin E. Greigg

[57] ABSTRACT

A fuel injection pump has a stepped piston operatively disposed in a stepped bore so as to define a first pump work chamber and a second pump work chamber. A constant fuel injection quantity ($h_{FE}$) is pumped to the second work chamber per pump piston stroke, and a variable fuel injection quantity is pumped out of the first pump work chamber to a common distributor groove which actuates delivery of the fuel to individual injection lines.

7 Claims, 3 Drawing Figures

FUEL INJECTION PUMP FOR SELF-IGNITING INTERNAL COMBUSTION ENGINES

BACKGROUND OF THE INVENTION

The invention is directed to improvements in fuel injection pumps provided with dual work chambers.

In a fuel injection pump of this kind, disclosed in German Offenlegungsschrift DE-OS 31 17 220, each pump work chamber communicates continuously with a respective relief line; these relief lines extend in the pump piston and have separate outlets on the pump piston and are controlled there by the slide. Also leading from each relief line is a respective transverse connection to each of the distributor openings, which cooperate with supply lines correspondingly distributed on the circumference of the stepped bore. In the known fuel injection pump, every pump work chamber is supplied with filling grooves, in the form of longitudinal grooves, during the intake stroke of the pump piston. Furthermore, the first pump work chamber communicates continuously with the relief chamber from the onset of the pump piston stroke until a predetermined stroke position.

This fuel injection pump operates in such a way that the fuel that is positively displaced out of the second pump work chamber continuously communicates with the fuel injection line, that is, from the onset of the pump piston supply stroke forward. Also, in addition to the fuel injection quantity that is positively displaced from the second pump work chamber, the fuel that is positively displaced, at high pressure, from the first work chamber also comes to be injected beyond a predetermined pump piston stroke.

This known apparatus has the disadvantage that it not only is very complicated in terms of distributing the fuel from the second pump work chamber and the first work chamber, but it also has very long injection times in full-load operation, which is very disadvantageous, especially if the fuel injection pump is intended for supplying an internal combustion engine that operates with direct injection. In particular, the injection duration in the known pump is shorter in the idling range than in the full-load range, which has an unfavorable effect both in terms of noise and in terms of engine performance. It is also unfavorable that the injection rate increases suddenly at the instant that the supply from the first pump work chamber is added. At this point of non-steady engine operation, governing problems must be expected.

OBJECT AND SUMMARY OF THE INVENTION

It is a principal object of the invention to provide a fuel injection pump having the advantage over the prior art that fuel supply from both pump work chambers begins with the supply stroke of the pump piston.

It is another object to provide a constant fuel quantity is pumped from the second pump work chamber and can be distributed over the entire, maximum possible pump piston stroke. Thus a small base quantity of supplied fuel is obtained, with a relatively low fuel injection rate, which is adequate for example for supplying the engine during idling. By effecting control with the slide, a variably large fuel quantity from the first pump work chamber is delivered to the appropriate fuel injection line together with this small base quantity.

It is still another object to provide that during idling, the fuel quantity pumped from this first pump work chamber is used to pressure the dead space in the system. To avoid deviations in the injection quantity, the dead space is regularly pressurized at the onset of the pump supply stroke.

It is yet another object to provide that depending upon the shift in position of the slide, the fuel quantity pumped from the first pump work chamber then increases, as the load increases, up to the point of full-load operation. Thus a generally uniform fuel supply duration is obtained, regardless of the load; during idling, in particular, a very low and uniform fuel injection rate is attained.

It is a further object of the invention to provide only one distributor opening and accordingly the number of supply bores on the circumference of the stepped bore, which have to be manufactured to extremely close tolerances, is reduced as well.

It is yet another object to provide a novel means of supplying fuel to the second pump work chamber as well as an exact limitation of the effective supply from this pump work chamber.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
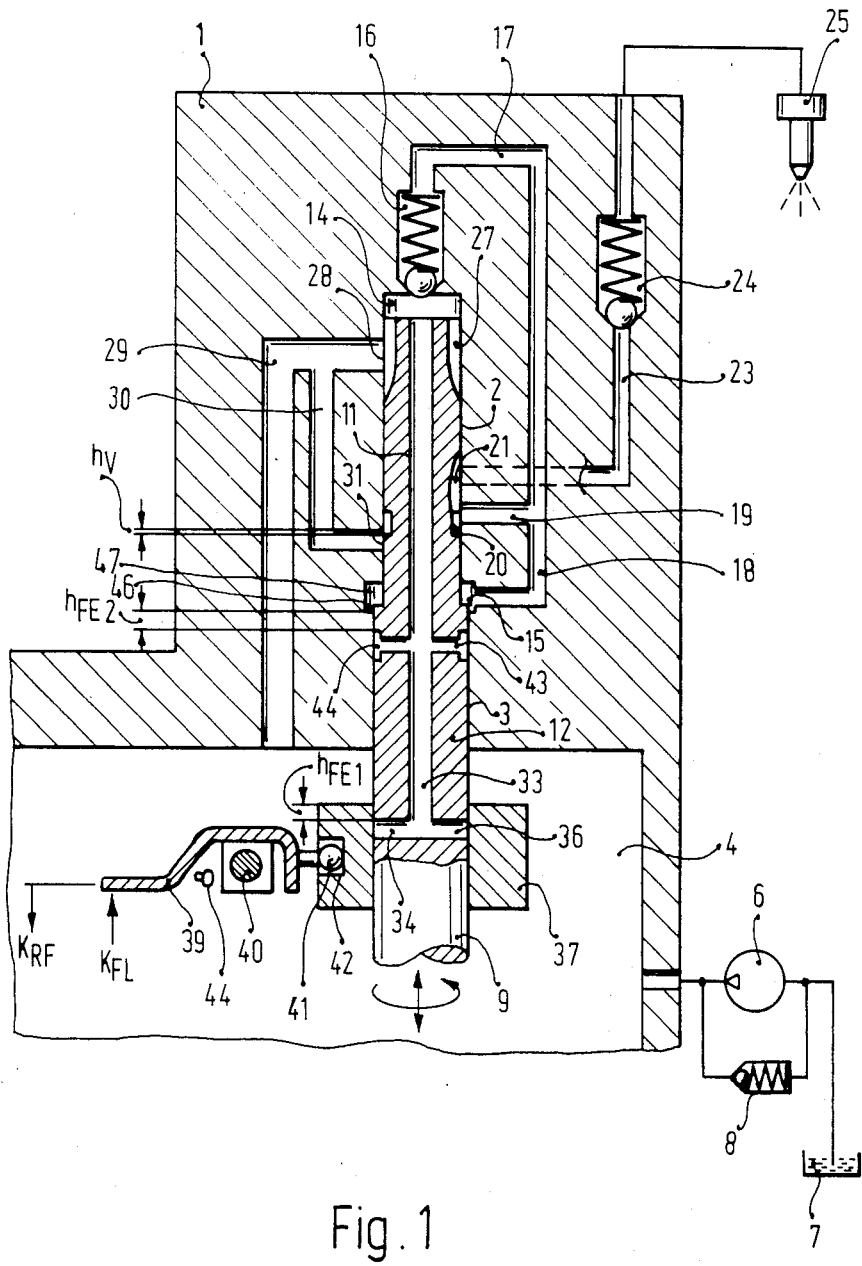
FIG. 1, in longitudinal section, shows that portion of the distributor fuel injection pump that is novel and essential to the invention, the pump comprising a stepped-piston injection pump.

In a housing 1 of a fuel injection pump, a stepped bore is provided, having a first stepped bore portion 2 of smaller diameter and an adjoining second stepped bore portion 3 of larger diameter. The second stepped bore portion discharges into a pump suction chamber 4, which in a known manner is supplied with fuel by a fuel feed pump 6 from a fuel supply container 7. To establish a predetermined fuel pressure in the pump suction chamber 4, a pressure control valve 8 is provided parallel to the fuel feed pump.

A stepped piston 9 is inserted into the stepped bore 2, 3, having a first stepped piston part 11 of smaller diameter and a second stepped piston part 12 of larger diameter, which protrudes into the pump suction chamber 4, where it is set by known means, not otherwise shown, into reciprocating motion, with which it effects pumping and aspirating, and simultaneously into rotary motion. With the first stepped piston part 11, the stepped piston encloses a first pump work chamber 14 in the first stepped bore portion 2, and with the second stepped bore part 12 together with the jacket surface of the first stepped piston part 11, the stepped piston encloses a second pump work chamber 15. A first supply line 17 leads away from the first pump work chamber 14 via a check valve 16, which opens in the outflow direction from the first pump work chamber 14; this first supply line 17 discharges into a second supply line 18, which is unclosable as it leads away from the second pump work chamber 15.

Via a common third supply line 19, the first and second supply lines discharge into the first stepped bore portion 2 and there discharge into an outer annular groove 20 located on the circumference of the first stepped piston part 11. Branching off from the outer annular groove 20 is a longitudinal groove 21, which comprises a distributor groove and during the rotation of the stepped piston 9 comes into communication successively with various injection lines 23 (only one of which is shown) during the individual supply strokes. The injection lines 23 lead away in a radial plane, distributed over the circumference of the first stepped bore portion 2. Each of the individual fuel injection lines carries the supplied fuel via a pressure valve 24 to a respective fuel injection nozzle 25, which is shown symbolically.

For supplying fuel, the first stepped piston part 11 has intake grooves 27 on its jacket face, which during the intake stroke of the pump piston, as the pump piston rotates, come into communication with intake openings 28 and join the pump work chamber 14 to a first intake conduit 29, which extends from the pump suction chamber 4 through the pump housing. Branching off from this intake conduit 29 is a second intake conduit 30, which likewise discharges into the first stepped bore portion 2, having an intake opening 31 which is located within the movement range of the outer annular groove 20. In the bottom dead center position of the pump piston (shown in FIG. 1) the outer annular groove 20 has opened the intake opening 31, so that fuel can flow out of the pump suction chamber via the annular groove 20, the supply line 19 and the second supply line 18 into the second pump work chamber 15. After a pre-stroke of the pump piston having a length of $h_v$, the intake opening 31 is closed by the stepped bore part 11.

A relief line 33 in the form of a longitudinal bore extending from the end face of the first stepped bore part 11 is provided in the pump piston 9. In the part of the pump piston 9 that protrudes into the pump suction chamber 4, the relief line 33 merges with a transverse conduit 34 and discharges at an outlet 36 on the jacket face of the pump piston. An annular slide 37 acting as the fuel quantity adjusting device is also provided on this part of the pump piston, in a known manner. Via the upper end edge of the annular slide 37, the outlet 36 is opened at an earlier or later point in the pump piston stroke; the distance of movement of the slide (designated as $h_{FE1}$) is taken from the supply onset of the pump piston on, depending upon its relative position with respect to the pump piston, so that the remaining fuel supplied by the pump piston from the first pump work chamber 14 can flow back to the suction chamber 4. From this point on, the high-pressure supply of fuel into the respective fuel injection line 23 is interrupted. The stroke position of the annular slide 37 is effected in a known manner by a governor, which is coupled with the annular slide 37 via a governor lever 39 and is acted upon by an rpm-dependent force $K_{FL}$ counter to a variable restoring force of a governor spring $K_{RF}$. The governor lever is pivotable about a shaft 40 which is preferably adjustable and provided with a ball 41 secured to a lever arm to engage a corresponding recess 42 in the annular slide 37.

Branching off from the relief line 33 is a transverse conduit 43, the outlet 44 of which penetrates the jacket face of the second stepped piston part 12 to communicate, after a pump piston stroke having the length $h_{FE2}$, with the second pump work chamber. This communication is effected once the outlet 44 passes by limiting edge 46 on the side nearer the pump suction chamber, of a recess 47 that is in continuous communication with the second pump work chamber 15. After completion of this stroke $h_{FE2}$, after the onset of the pump piston supply stroke, the second pump work chamber is thus relieved toward the relief line 33 and thus toward the pump suction chamber 4.

During the intake stroke in the illustrated position of the pump piston 9, the pump work chambers 14 and 15 are thus supplied with fuel via the intake conduit 29. Since the outlet 36 is closed at this time, during the ensuing pump piston supply stroke fuel is positively displaced at high pressure from the individual pump work chambers upon opening 31 being closed, following a pre-stroke of length $h_v$. During high pressure supply, the longitudinal groove 21 is in communication with one of the injection lines 23, and the fuel pumped out of the first pump work chamber 14 into the first supply line 17 is distributed to that injection line 23. At the same time, the pump piston also pumps fuel out of the second pump work chamber 15, via the second supply line 18, to the distributor groove 21.

As soon as the outlet 36 is opened, after the pump stroke of length $h_{FE1}$, no further fuel is pumped into the first supply line 17. The stepped piston part 12, which continues to pump, now delivers the remaining fuel injection quantity to the distributor groove 21; the check valve 16 prevents fuel from flowing out through the relief line 33. When the outlet 44 opens, then the remaining high-pressure pumping by the pump piston is terminated as well. The positive displacement of the second stepped piston part 12 and the effective supply stroke $h_{FE2}$ are adapted such that the fuel quantity pumped out of the second pump work chamber is sufficient for the low load range of the engine.

Figure 2:
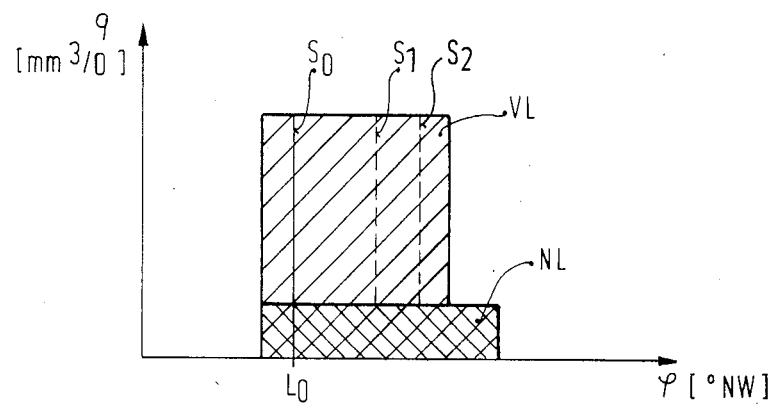
FIG. 2 is a diagram showing the distribution of the fuel injection quantities from the individual pump work chambers.

As the diagram in FIG. 2 shows, a low fuel injection rate, represented by the cross-hatched area NL, is attained over a maximum pump piston stroke. The fuel quantity pumped at high pressure out of the first pump work chamber, on the contrary, is variable, partly due to the action of annular slide 37, and is indicated by the shaded area VL in FIG. 2. Depending upon the position of the annular slide, this high pressure fuel supply varies in duration, and assumes the position of, one of the vertical dashed lines $S_1$, or $S_2$.

The injection pump is designed advantageously such that at low load $L_0$, corresponding to the line $S_0$, the fuel quantity required for filling and pressurizing the dead space between the pump work chamber and the injection location is pumped out of the first pump work chamber 14. The actual injection quantity is then drawn by pumping from the second pump work chamber. This has the advantage that the dead space is very rapidly pressurized, in accordance with the higher injection rate of the first stepped piston part 11, with an ensuing lower fuel injection delivery rate in order to generate the quietest possible course of combustion.

Figure 3:
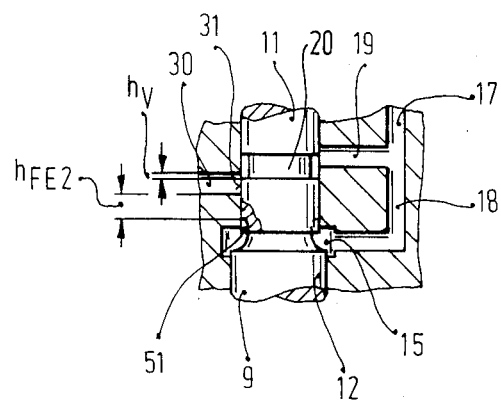
FIG. 3 shows a variant upon the embodiment shown in FIG. 1 in an enlarged detailed partial section.

In FIG. 3, a variant of the exemplary embodiment of FIG. 1 is shown. This variant has a different means of relieving the second pump work chamber 15 at the end of the effective supply stroke of the second stepped piston part 12. Similar parts are given the same numbers in this variant embodiment in which the annular groove 20 is provided on the first stepped piston part, along with the third supply line 19 discharging into the first stepped bore 2; this third supply line 19 communicates with the first supply line 17 and the second supply line 18 that leads to the second pump work chamber. As in the exemplary embodiment of FIG. 1, the intake opening 31 of the additional intake conduit 30 is shown discharging into the stepped bore portion 2 and provided with a similar overlap relationship $h_v$ with the annular groove 20.

Differing from the exemplary embodiment of FIG. 1, a recess 51 is now provided at the transition from the second stepped piston part 12 to the first stepped piston part 11; the recess 51 is for instance in the form of a longitudinal groove and communicates continuously with the second pump work chamber 15, its upper limiting edge being remote by a stroke of length $h_{FE2}$ from the overlap with the intake opening 31 whenever the pump piston 9, as shown in the drawing, is in its bottom dead center position. Thus the effective supply stroke of the second stepped piston part 12 can also be limited in a very simple manner, without requiring additional bores besides the stepped bore. If the mouth of the intake conduit 30 into the first stepped bore part 2 is provided with only a single inlet opening 31 as described above, then the recess 51 is advantageously formed as an annular groove, so that the diversion of fuel can be effected independently of the rotational position of the pump piston.

The above-described operating principle can also be achieved by means of inter-nested pump pistons, instead of a stepped piston. In this variant, the pump piston having the smaller diameter is connected in a stationary manner with the pump housing so as to plunge into a coaxial cylindrical bore in the other, driven, part of the piston, where it encloses the first pump work chamber. By way of the supply line, which now extends in the first, smaller pump piston and which contains the check valve, the fuel positively displaced out of the first pump work chamber is now pumped into the injection line via the second pump work chamber and the distributor groove on the driven pump piston. The relief line 33 of the first work chamber extends within the driven pump piston and is controlled by means of the slide which is displaceable on this driven pump piston.

The foregoing relates to preferred exemplary embodiments of the invention, it being understood that other variants and embodiments thereof are possible within the spirit and scope of the invention, the latter being defined by the appended claims.

What is claimed and desired to be secured by letters patent of the United States is:

1. A fuel injection pump for self-igniting internal combustion engines, comprising:
    a first pump piston of small diameter defining with a first cylindrical bore a first pump work chamber;
    a second pump piston of larger diameter disposed in a second cylindrical bore of complemental diameter and arranged to be driven so as simultaneously to reciprocate and rotate, such reciprocating movement simultaneously effecting reciprocating movement of the first and second pump pistons within their respective cylindrical bores;
    a jacket face provided on the first pump piston defining with said second bore a second pump work chamber;
    said chambers being connectable via a fuel supply line and a distributor opening disposed in the jacket face of the pump piston, upon successive pump piston supply strokes, with a respective one of a plurality of injection lines disposed serially about the circumference of the first cylindrical bore;
    a check valve being disposed in the supply line and arranged to open in the supply direction from one of the pump work chambers and to close in the supply direction from the other of the pump work chambers so that the first pump work chamber is disconnected from the second pump work chamber;
    said pump piston being provided with a relief line extending therethrough serving to relieve said first pump work chamber via an outlet means;
    said outlet means being arranged selectively for opening and closing by means of an adjustable slide upon said pump piston having traversed a given stroke length ($h_{FE1}$);
    the first and second pump work chambers being arranged for communication with a fuel supply source via control openings disposed in the pump piston during an intake stroke of the pump piston;
    the first pump work chamber being arranged to communicate continuously with the relief line and its outlet, while the second pump work chamber communicates with the relief line only upon execution of a predetermined pump piston stroke ($h_{FE2}$).

2. A fuel injection pump as defined by claim 1, further comprising a single distributor opening is provided on the pump piston in communication with an annular groove thereon, and said annular groove further communicates via a common outlet with a first supply line leading away from the first pump work chamber and a second supply line leading away from the second work chamber to effect common connection with a stepped transition portion disposed between said first and second pump pistons.

3. A fuel injection pump as defined by claim 2, further comprising said check valve is disposed in the first supply line and the annular groove is arranged to be connected with a fuel source via a fuel intake conduit, said connection being established upon execution by the pump piston of a pre-stroke of predetermined length ($h_v$) effected prior to the end of an intake stroke of the pump piston, the pre-stroke of said pump piston ($h_v$) being shorter than said predetermined pump piston stroke ($h_{FE2}$).

4. A fuel injection pump as defined by claim 3, further comprising the second pump work chamber is arranged to be connected with the fuel intake conduit via a recess disposed on the pump piston at the end of said predetermined pump piston stroke ($h_{FE2}$).

5. A fuel injection pump as defined by claim 3, further comprising the second pump work chamber is connected via a recess disposed in the second cylindrical bore with a connecting opening leading to the relief line extending through second pump piston, at the end of the predetermined pump piston stroke ($h_{FE2}$).

6. A fuel injection pump as defined by claim 1, further comprising the first pump piston and the second pump piston together comprise a stepped piston, the first cylindrical bore and the second cylindrical bore comprise a complementally stepped bore for said stepped piston, and said stepped piston is provided with a common relief line extending longitudinally therethrough.

7. A fuel injection pump as defined by claim 1, further comprising one of the pump pistons is positively associated with a pump housing and arranged to plunge into a cylindrical bore disposed within another, driven pump piston so as to define the pump work chamber which can be relieved via the relief line, the relief line being disposed in the driven pump piston and being controlled by the adjustable slide.

* * * * *